United States Patent Office 2,823,197
Patented Feb. 11, 1958

2,823,197

POLYESTERS AND THEIR PREPARATION

Rupert C. Morris, Berkeley, Vernon W. Buls, Walnut Creek, and George W. Conklin, Oakland, Calif., assignors to Shell Development Company, New York, N. Y., a corporation of Delaware No Drawing. Application July 1, 1954
Serial No. 440,864

15 Claims. (Cl. 260—75)

This invention relates to polyesters and their preparation. More particularly, the invention relates to a new class of improved polyesters prepared from polynuclear polycarboxylic acids and to the utilization of these polyesters, particularly in the preparation of fibers and filaments and improved coating compositions.

Specifically, the invention provides new and particularly useful polyesters comprising polyesters of polycarboxylic acids having at least three six-membered carbocyclic rings separated by bivalent aliphatic radicals and having at least two carboxyl groups attached to different carbocyclic rings, such as, for example, dicarboxydibenzylbenzene, and polyhydric alcohols. The invention also provides improved coating compositions prepared from the above-described polyesters, and particularly those prepared from polyhydric alcohols containing at least three hydroxyl groups.

As a special embodiment, the invention also provides certain new aliphatic polycarboxylic acids possessing at least three six-membered cycloaliphatic rings separated by bivalent aliphatic radicals and having at least two carboxyl groups attached to different cycloaliphatic rings.

This application is a continuation-in-part of our application Serial No. 249,626, filed October 3, 1951, now abandoned.

It is an object of the invention to provide a new class of polyesters. It is a further object to provide new polyesters prepared from polycarboxylic acids having a plurality of carbocyclic rings attached through bivalent aliphatic radicals. It is a further object to provide new polyesters which have unusually high melting points and are particularly useful in the formation of heat resistant synthetic fibers and filaments. It is a further object to provide new polyesters which are valuable as plasticizing agents. It is a further object to provide new polyesters that can be used to give improved coating compositions. It is a further object to provide new cycloaliphatic polycarboxylic acids having properties which may then be particularly useful and valuable in industry. These and other objects of the invention will be apparent from the following detailed description thereof.

It has now been discovered that these and other objects may be accomplished by the polyesters of the invention comprising polyesters of polycarboxylic acids having at least three six-membered carbocyclic rings separated by bivalent aliphatic radicals and having at least two carboxyl groups attached to different carbocyclic rings, and polyhydric alcohols. These polyesters have been found to possess many unusual properties which make them particularly useful and valuable in industry. The linear polyesters prepared from the dihydric alcohols may, for example, be drawn into fibers that can be oriented by cold drawing. The resulting fibers are hard and pliable and have excellent heat stability. The fibers prepared from these polyesters, for example, do not decompose at temperatures below about 375° C. to 400° C., while many of the commercial polyester fibers decompose at temperatures below 300° C.

The polyesters prepared from alcohols having three or more hydroxyl groups, such as, for example, glycerol, pentaerythritol, and hexanetriol, have been found to be particularly outstanding as components for coating and impregnating compositions. They are especially valuable as additives for lacquers and enamels containing urea-aldehyde and melaminealdehyde resins as they tend to impart increased hardness and durability thereto.

The polycarboxylic acids, polyesters of which are provided by the present invention, comprise those acids having at least three six-membered carbocyclic rings separated by bivalent aliphatic radicals and having at least two carboxyl groups attached to different carbocyclic rings. The carbocyclic rings may be aromatic or cycloaliphatic and, if cycloaliphatic, may be saturated or unsaturated. The rings may also be substituted, if desired, with other substituents, such as halogen atoms, alkoxy radicals and the like. The acids preferably contain only two carboxyl groups but may contain three, four or more such groups. Examples of these acids include, among others, dicarboxydibenzylbenzene, di(carboxyphenylethyl)isopropylbenzene, di(carboxybenzylphenyl)methane, dicarboxydibenzylchlorobenzene, di(carboxychlorophenyl)benzene, di(carboxycyclohexylmethyl)cyclohexane, di(carboxycyclohexylmethyl)isopropylcyclohexane, di(carboxycyclohexylmethylcyclohexyl)methane, di(carboxycyclohexenylmethyl)cyclohexene, and dicarboxydicyclohexylchlorocyclohexane.

Preferred polycarboxylic acids are those of the formulae:

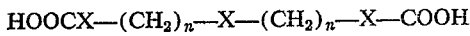

and

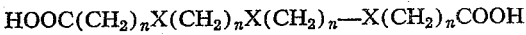

wherein X is a cycloaliphatic bivalent radical or aromatic bivalent radical or a chloro or alkyl substituted derivatives thereof wherein the two free valences are in the No. 1 and 4 positions on the 6-membered cycloaliphatic or aromatic ring in the said radicals, and $n$ is an integer from 1 to 5.

Coming under special consideration, particularly because of the fine properties of their polyesters as plasticizers are the cycloaliphatic acids, and particularly those of the formulae:

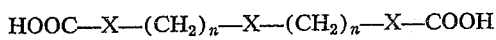

and

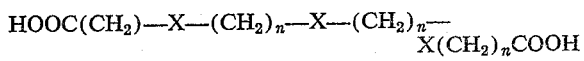

wherein X is a cycloaliphatic bivalent radical or a chloro or alkyl substituted derivative wherein the two free valences are in the Nos. 1 and 4 positions on the 6-membered cycloaliphatic ring.

The above-described aromatic polycarbonylic acids are preferably obtained by reacting a halogenated alkyl aromatic acid with an aromatic compound having two replaceable hydrogen atoms. This reaction may be exemplified by the following equation showing the preparation of dicarboxydibenzylbenzene by reacting 2 moles of chloromethylbenzoic acid with a mole of benzene:

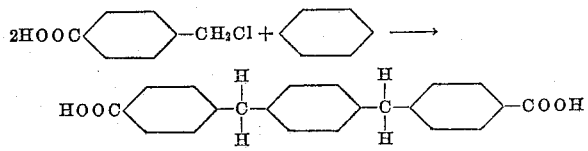

The halogenated alkyl aromatic acids used in this process may be conveniently prepared by halongenating the corresponding alkyl-substituted aromatic acid in the presence of a catalyst, such as ultraviolet light, that is known to promote the halogenation in the side chain. Chloromethylbenzoic acid may be prepared by this method, for example, by bubbling chlorine into a reaction medium containing toluic acid in the presence of ultraviolet light, preferably having a wave length between 1000 and 6000 Angstroms.

Alkyl-substituted aromatic acids that may be used in the halogenation reaction may be exemplified by toluic acid, n-butylbenzoic acid, isopropylbenzoic acid, isobutylphthalic acid, methylisophthalic acid, methylterephthalic acid, 4,4'-dicarboxy-3,3'-dimethyldiphenyl, 4,4'-dicarboxy-3,3'-dibutyldiphenyl, ethylcyanobenzoic acid, and the like. Preferred acids of this type are the alkyl-substituted benzoic acids wherein the alkyl group contains no more than 6 carbon atoms.

The compound containing the two replaceable hydrogen atoms to be used in the condensation reaction with the above-described halo-alkyl aromatic acids may be exemplified by benzene, toluene, isopropylbenzene, xylene, tert-butylbenzene, naphthalene, butylbenzene, methyl benzene, and the like.

The condensation is accomplished by heating the components together, preferably in the presence of a Friedel-Crafts metallic halide catalyst. Suitable catalysts of this type include ferric chloride, aluminum chloride, zinc chloride, stannic chloride, boron fluoride, copper chloride, zirconium tetrachloride, titanium tetrachloride, and aluminum bromide. The catalyst may be employed as such or in solution or other highly dispersed forms. The addition compounds of the metal halides with water, alcohol, ether acids, etc., may also be used. The amount of the catalyst employed will vary over a wide range depending upon the particular reactants and conditions employed. In most cases, the catalyst will be used in amounts varying from 1% to 20% by weight of the reactants, and more preferably from 2% to 5% by weight of the reactants.

The amount of the reactants employed will vary over a wide range. In order to effect replacement of two of the hydrogen atoms, the components should be combined so as to have at least two moles of the halo-alkyl aromatic acid for every mole of the aromatic compound having the two replaceable hydrogen atoms but larger ratios than this can be employed if desired. Preferred ratios vary from 2:1 to 5:1.

The condensation may be accomplished in the presence or absence of solvents or diluents. If solvents or diluents are employed, they may be those that are relatively inert or those that may take part in the reaction. Such solvents include hydrocarbons, such as carbon tetrachloride, chloroform, ethylene dichloride, tetrachloroethane, and the like, and mixtures thereof. If the solvent selected takes part in the reaction, an excess of that amount required should be employed.

Suitable temperatures to be employed in the process range from about 25° C. to about 150° C. Temperatures much above 150° C. should generally not be employed as they cause polymerization instead of the formation of the desired monomeric acids. Preferred temperatures range from about 80° C. to about 140° C. Atmospheric, superatmospheric or subatmospheric pressures may be used as desired or necessary.

The hydrogen chloride formed in the reaction may be removed from the reaction chamber by any of the well known conventional methods. The acids or derivatives formed in the reaction may be recovered at the end of the process by any suitable method, such as precipitation, filtration, distillation, and the like.

The cycloaliphatic polycarboxylic acids and the acids containing both cycloaliphatic and aromatic rings may be obtained by hydrogenation or partial hydrogenation of the above-described aromatic polycarbonylic acids. The hydrogenation is preferably accomplished by contacting a relatively water soluble salt of the aromatic acids, such as an alkali metal salt, with hydrogen at an elevated temperature and pressure in the presence of a hydrogenation catalyst, such as Raney nickel. Temperatures used in this preferred process preferably vary from about 100° C. to about 250° C. Preferred pressures vary from about 500 to 1000 pounds per square inch.

The type of alcohol used in the preparation of the polyesters will depend on the product desired. If linear polyesters are desired for formation of fibers, one should select a dihydric alcohol, and preferably an aliphatic dihydric alcohol, such as, for example, ethylene glycol, diethylene glycol, triethylene glycol, 1,5-pentanediol, hexanediol-1,6, 3-ethyl hexanediol-1,3, glycerol monoallyl ether, 2,4-butadien-1,4-diol, 2,8-dodecanediol, thiodipropanol, sulfonyldipropanol, glycerol monobutyrate, 2,5-dimethyl-2,6-heptanediol, and the like. Particularly preferred alcohols to be used for this purpose are the alkanediols, thiaalkanediols and oxaalkanediols, and especially those containing no more than 12 carbon atoms.

If the polyester is to be used in the preparation of coating compositions, one should select a polyhydric alcohol having at least three hydroxyl groups, such as, for example, glycerol, hexanetriol, pentaerythritol, mannitol, methyltrimethylolmethane, 1,4,6-octanetriol, 1,3,7-heptanetriol, polypentaerythritol, polyallyl alcohol, polymethallyl alcohol, tetrohydroxycyclohexane, trihydroxybenzene, 3,5-dithioctanetriol, polyols formed by the condensation of bis-phenols with epichlorohydrin, and the like. Particularly preferred alcohols of this type comprise the aliphatic alcohols possessing from 3 to 6 esterifiable hydroxyl groups, and more preferably the alkanepolyols, thiaalkanepolyols and oxaalkanepolyols possessing from 3 to 5 hydroxyl groups and not more than 12 carbon atoms.

The polyesters are formed by merely heating the desired polycyclic polycarboxylic acid with the polyhydric alcohol, preferably in an inert atmosphere. Ordinarily no catalysts need be employed to effect this reaction, but, if desired, substances as sulfuric acid, p-toluenesulfonic acid, zinc chloride, stannic chloride, calcium acetate, barium acetate, and the like, in amounts varying from about 0.1% to 5% by weight of reactants may be employed.

The proportion of reactants to be used in the polyester formation reaction may vary depending upon the properties desired in finished product. Ordinarily, the polycarboxylic acid will be reacted with at least a chemical equivalent amount of the polyhydric alcohol. A "chemical equivalent amount" as used herein in this regard refers to that amount of alcohol needed to furnish one OH group for every carboxyl group. Preferably one reacts the acid with an excess up to 50% excess of the alcohol.

The polyester formation may be accomplished in the presence or absence of diluents. If solvents and diluents are employed, it is desirable to utilize inert organic compounds, such as benzene, toluene, xylene, cyclohexane and the like, and mixtures thereof.

If trihydric alcohols are employed in formation of alkyd resins for use in coatings and the like it may also be desired to add modifying agents to the resinous mixture. Modifying agents are preferably monocarboxylic acids, such as, for example saturated aliphatic and cycloaliphatic monocarboxylic acids, unsaturated cycloaliphatic and aliphatic monocarboxylic acids, aromatic and substituted aromatic, such as halo- and alkyl-substituted aromatic monocarboxylic acids. Examples of such acids include, among others, butyric acid, capric acid, cyclohexanecarboxylic acid, chlorobutyric acid, benzoic acid, p-tert-butyl benzoic acid, 3,5-di-tert-butylbenzoic acid, chlorobenzoic acid, fatty acids derived from natural oils, as drying oils, semidrying oils and nondrying oils, such as linseed, soybean, perilla, tung, walnut, pineseed, olive, oiticica, corn, cottonseed, cocoanut, hemp seed, herring, poppy seed, mustard, peanut, rapeseed, salmon, dehydrated castor oil, rubber seed, safflower, and the like, and mixtures thereof.

Temperature employed during the polyester formation may vary depending on reactants. In most cases, the temperature will range between 100° C. and 250° C., with a preferred range of between 200° C. to 230° C.

It is preferred to accomplish the preparation of the resins under a blanket of inert gas, at least during the initial stages of the reaction. By an inert gas is meant one substantially devoid of molecular oxygen, such as nitrogen, carbon dioxide, helium, methane, and the like.

The water formed during the reaction may be removed during the reaction or at its completion. It is preferably removed during the course of the reaction preferably as fast as it is formed therein. The removal of the water may be accomplished by any suitable method, such as azeotropic distillation with components, such as xylene and benzene. The water may also be removed by the passage of the inert gas, such as carbon dioxide, through the reaction zone.

If the polyhydric alcohol employed in the reaction contains three or more hydroxyl groups, there may be danger of gelation and care should be taken to avoid such action. This may be avoided by not overheating and not heating the mixture too long. To prevent this difficulty, it is best to follow the course of the reaction by making determinations of the viscosity and acid number on samples withdrawn from the reaction mixture. The heating is then discontinued after the viscosity has reached the desired value and the acid number has been reduced to a value between about 5 and 30.

When the reaction is substantially complete, the inert solvents or diluents, remaining water and uncombined reactants are preferably removed from the reaction mixture. Removal is conveniently accomplished by vacuum distillation, although fractional distillation, precipitation, etc., may also be utilized.

It is also possible to prepare the polyesters of the invention by using an ester-exchange reaction wherein an ester of the polycarboxylic acid is heated with the desired polyhydric alcohol in the presence of an ester-exchange catalyst and the monohydric alcohol formed in the reaction removed as by distillation. Esters of the polycarboxylic acids used in this reaction are preferably the lower alkyl or alkenyl esters, such as their methyl, ethyl, butyl, allyl, vinyl, pentyl esters, but in some cases higher esters, e. g., their octyl esters, may also be employed. Suitable ester-exchange catalysts that may be used in this type of reaction include, among others, alkali metal alcoholates, such as sodium and potassium alcoholates; metals, such as copper, zinc, lithium, magnesium, such as in the form of powder, shavings, etc.; aluminum alkoxides, sodium phenoxide, and the like, in amounts preferably varying from about .1% to 5% by weight. Proportions of reactants and reaction temperatures are substantially the same as those described above for straight esterification reaction.

The polyesters of the invention are high melting solid resins. The resins prepared from the dihydric alcohols are particularly useful in that they may be drawn into fibers which can be oriented by cold drawing. The resulting fibers are very strong and pliable and have good dielectric properties and durability. In addition, they have excellent heat stability and are superior in this regard to many of the commercial polyester fibers.

The polyesters prepared from the dihydric alcohols and the cycloaliphatic polycarboxylic acids are also useful and valuable as plasticizers for vinyl polymers, such as polymers and copolymers of vinylidene chloride, styrene, methyl methacrylate and the like. Vinyl polymer compositions containing these polyesters in amounts varying from 25 parts to 100 parts over 100 parts of polymer have excellent strength and flexibility and good resistance to water extraction. Vinyl polymer compositions containing the polyesters also have excellent resistance to loss of plasticizers through evaporation and/or migration.

The polyesters prepared from the alcohols having more than two hydroxyl groups are particularly valuable in the preparation of surface coating and impregnating compositions. For this application, they may be combined with various coating solvents or oils or may be added to compositions containing film-forming components such as vinyl polymers, aminoplast resins, cellulose ether and esters and the like. They are particularly useful in the preparation of baking lacquers and enamels. In this case they are preferably combined with urea-formaldehyde or melamine-formaldehyde resins and other desired components, such as pigments, plasticizers, stabilizers, and the like, and the mixture then diluted with solvents or diluents to provide a composition having the desired viscosity. This composition may then be applied to the desired surface and baked at temperatures generally varying from 100° C. to 175° C. The resulting baked films are very hard and have good resistance to water and solvents.

The new cycloaliphatic polycarboxylic acids prepared as described above have been found to have other unique and valuable properties in addition to their use in preparation of the claimed polyesters. They find application as additives for lubricating compositions, grease compositions, herbicidal, fungicidal and insecticidal compositions as well as additives for various impregnating compositions.

The new cycloaliphatic polycarboxylic acids may also be used to prepare valuable derivatives, such as monomeric esters and amides as well as polyamides. The monomeric esters and amides are particularly valuable as plasticizers for vinyl halide polymers as they have a high degree of compatibility with these polymers and the resulting compositions have good strength and flexibility over a wide range of conditions. In addition, the esters and amides are not easily lost from the compositions through vaporization or migration and the plasticized compositions are able to withstand long periods of exposure to high temperatures without shrinking or becoming embrittled.

The monomeric derivatives containing a polymerizable linkage, such as the ethylenically unsaturated esters and amides, as the allyl and vinyl esters and the N-alkenyl substituted amides, may also be polymerized to produce valuable thermosetting polymeric materials. Those derivatives containing at least two unsaturated linkages can be polymerized to produce especially valuable thermosetting products. The polymerization is preferably accomplished by merely heating the derivatives in the presence of a peroxide catalyst, such as benzoyl peroxide, tert-butyl hydroperoxide, tert-butyl perbenzoate, cymene hydroperoxide, tert-butyl peracetate, and mixtures thereof, in amounts preferably varying from about 1% to 5% by weight. The polymerization may be effected in bulk, in the presence of solvents or diluents, or in an aqueous emulsion or suspension.

To illustrate the manner in which the invention may be carried out, the following examples are given. It is to be understood, however, that the examples are for the purpose of illustration and the invention is not to be regarded as limited to any of the specific conditions or reactants cited therein. Unless otherwise specified, parts described in the examples are parts by weight.

*Example I*

About 45.5 parts (0.267 mole) of 4-chloromethylbenzoic acid is combined with 10 parts (0.128 mole) of benzene and 8 parts of ferric chloride and the resulting mixture gradually warmed. There is a rapid evolution of hydrogen chloride as the temperature approaches 125° C. and when it reaches 139° C. no further gas is liberated. A titration showed that 96% of the required hydrogen chloride has been formed. The reaction mixture is then cooled and shaken with 5% sodium hydroxide. The aqueous phase is filtered, treated with charcoal and then acidified. The residue is then treated with hot water and recrystallized from alcohol. The resulting product is a white, crystalline solid having a melting point of 260–280° C. The acid is identified as dicarboxydibenzylbenzene

Anal. Calcd. for $C_{22}H_{18}O_4$: C, 76.3%; H, 5.20. Found: C, 75.2; H, 5.45.

About 35 parts (.1 mole) of the dicarboxydibenzylbenzene produced above is mixed with 49.7 parts (.8 mole) of ethylene glycol and 1 part of concentrated sulfuric acid and the mixture gradually heated up to 170° C. and then held in the range of 170° C. to 230° C. until the reaction is complete. A slow stream of carbon dioxide is sent through the charge to eliminate the air and carry away the water of esterification. The excess glycol is then removed under reduced pressure. The resulting product is a high melting light brown solid resin. The resin could be drawn into fibers which could be permanently oriented by cold drawing. The fibers have excellent heat stability and did not decompose at temperatures as high as 375° C.

*Example II*

About 35 parts of the dicarboxydibenzylbenzene produced as in Example I is mixed with 85 parts of diethylene glycol and 1 part of sulfuric acid and the mixture gradually heated up to 225° C. and held at that temperature until the reaction is complete. A slow stream of carbon dioxide is sent through the charge to eliminate the air and carry away the water of esterification. The excess glycol is then removed under reduced pressure. The resulting product is a high melting light yellow solid resin. The resin could be drawn into fibers which could be permanently oriented by cold drawing. The fibers have excellent heat stability and do not decompose at temperatures as high as 375° C.

*Example III*

A potassium salt of dicarboxydibenzylbenzene produced as in Example I is prepared by dissolving 500 parts of the polycarboxylic acid in 1000 parts of potassium hydroxide solution. About 10 parts of Raney nickel is then added to 200 parts of the above-described solution and the resulting mixture exposed to 1500 pounds hydrogen pressure at a temperature between 150° C. and 175° C. When no further reduction in pressure takes place, the product is recovered by filtration and subsequently acidified. The solid that separates is filtered and dried. The solid that is recovered after recrystallization from dilute alcohol is identified as di(carboxycyclohexylmethyl) cyclohexane.

About 32 parts of the di(carboxycyclohexylmethyl) cyclohexane is mixed with 52 parts of 1,5-pentanediol and 1 part of concentrated sulfuric acid and the mixture gradually heated up to 225° C. and held at that temperature until the reaction is complete. A stream of carbon dioxide is sent through the charge to eliminate the air and carry away the water of esterification. The excess glycol is then removed under reduced pressure. The resulting product is a high melting solid resin which can be melt drawn into fibers which are strong and elastic.

Esters having related properties in the formation of fibers are obtained by replacing the 1,5-pentanediol in the above preparation process with equivalent amounts of each of the following: diethylene glycol, triethylene glycol, 1,6-hexanediol, sulfonyldipropanol and 1,4-butendiol.

*Example IV*

About 182 parts of 4-chloroethylbenzoic acid is combined with 60 parts of benzene and 10 parts of ferric chloride and the resulting mixture gradually warmed. Hydrogen chloride is liberated as the temperature approaches 125° C. and when it reaches 140° C. no further gas is liberated. After the reaction is complete, the mixture is cooled and shaken with 5% sodium hydroxide. The aqueous phase is filtered, treated with charcoal and then acidified. The residue is then treated with hot water and recrystallized from alcohol. The resulting product is a white crystalline solid melting above 280° C. and identified as di(carboxyphenylethyl) isopropylbenzene.

About 39 parts of the di(carboxyphenylethyl) isopropylbenzene produced as above is mixed with 56 parts of thiodipropanol $(HOCH_2CH_2CH_2SCH_2CH_2CH_2OH)$ and .5 part concentrated sulfuric acid and the mixture gradually heated up to 200° C. and held at that temperature until the reaction is complete. A slow stream of carbon dioxide is sent through the charge to eliminate the air and carry away the water of esterification. The excess thiodipropanol is then removed under reduced pressure. The resulting product is a high melting light brown solid resin. The resin can be drawn into fibers which can be permanently oriented by cold drawing. The fibers have excellent heat stability and do not decompose at temperatures as high as 375° C.

*Example V*

900 parts of dicarboxydibenzylbenzene produced as in Example I, 240 parts of glycerol and 360 parts of dehydrated castor oil are placed in a reaction flask equipped with a stainless steel stirrer, nitrogen bubbler, thermometer and phase separating condenser. Xylene is used to remove the water azeotropically. The charge is brought to a cooking temperature of 250° C. and held at that temperature till the reaction is complete. The resulting polyester had an acid number of 5 to 8 (mg. KOH g.).

A white baking enamel is prepared by combining 100 parts of titanium dioxide, 50 parts of the polyester prepared above and 50 parts of a butylated melamine-formaldehyde resin (Melmac 248–8) and adding xylene to obtain the desired viscosity.

The above-described enamel is sprayed on cold roll steel panels to form a film having thickness of 1 to 1.5 mils and the films are baked for 12 minutes at 160° C. The resulting films are very hard and have good resistance to water and solvents.

*Example VI*

830 parts of di(carboxycyclohexylmethyl) cyclohexane produced as in Example III, 350 parts of 1,2,6-hexanethiol and 362 parts of cocoanut fatty acids are placed in the reaction flask described in the preceding example with toluene as the azeotrope former. The charge is brought to a cooking temperature of 230° C. and held at that temperature till the reaction is complete. The resulting product is a light brown solid having an acid number of 8–10.

A clear lacquer composition is prepared by combining 40 parts of the polyester produced above with 60 parts of a melamine-formaldehyde resin (Melmac 248–8) and adding toluene to form the desired viscosity.

The above-described lacquer is then flowed out on tin plate panels to form a film having thickness of 1 mil. These panels are then baked for 30 minutes at 150° C. The resulting films are hard and flexible and have good resistance to water and solvents.

We claim as our invention:

1. A resinous polyester of a polycarboxylic acid having a linear chain containing at least three six-membered carbocyclic rings which are joined together in series by bivalent aliphatic hydrocarbon radicals which contain only carbon-to-carbon linkages and having at least two carboxyl groups attached to separate carbocyclic rings, and a polyhydric alcohol.

2. A resinous polyester as defined in claim 1 wherein the carbocylic rings in the acid molecule are aromatic rings.

3. A resinous polyester as defined in claim 1 wherein the carbocyclic rings in the acid molecule are cycloaliphatic rings.

4. A resinous polyester as defined in claim 1 wherein the polyhydric alcohol is an aliphatic dihydric alcohol.

5. A resinous polyester as defined in claim 1 wherein the polyhydric alcohol is an aliphatic polyhydric alcohol possessing from 3 to 6 hydroxyl groups and not more than 12 carbon atoms.

6. A linear resinous polyester of a polycarboxylic acid having a linear chain containing at least three six-membered carbocyclic rings which are joined together in series by bivalent aliphatic hydrocarbon radicals which contain only carbon-to-carbon linkages and having two carboxy groups attached to different rings, and an aliphatic dihydric alcohol.

7. A resinous polyester as defined in claim 6 wherein the acid is dicarboxydibenzylbenzene.

8. A resinous polyester as defined in claim 6 wherein the alcohol is an alkanediol.

9. A resinous polyester as defined in claim 6 wherein the alcohol is a polyethylene glycol.

10. A resinous polyester of a polycarboxylic acid having a linear chain containing three six-membered carbocyclic rings which are joined together in series by bivalent alkylene radicals which contain only carbon-to-carbon linkages and having two carboxyl groups attached to different rings, and aliphatic polyhydric alcohols containing no more than 12 carbon atoms.

11. A resinous polyester as in claim 10 wherein the acid is di(carboxycyclohexylmethyl)cyclohexane and the alcohol is 1,5-pentanediol.

12. A resinous polyester as in claim 10 wherein the alcohol is thiodipropanol.

13. A resinous polyester as in claim 10 wherein the acid is dicarboxydibenzylbenzene and the alcohol is glycerol.

14. A resinous polyester of a polycarboxylic acid having a linear chain containing three six-membered carbocyclic rings which are joined together in series by bivalent alkylene radicals which contain only carbon-to-carbon linkages and having two carboxyl groups attached to different rings, and an aliphatic alcohol containing at least three hydroxyl groups, said polyester being modified with a monocarboxylic acid.

15. A resinous polyester of dicarboxydibenzylbenzene and ethylene glycol.

References Cited in the file of this patent

FOREIGN PATENTS 604,074     Great Britain _____ June 28, 1948

OTHER REFERENCES

Weiss et al.: Beilstein, 4th edition, 2nd supplement, volume 9, page 696 (1949).